United States Patent
Chollet et al.

(10) Patent No.: US 10,132,399 B2
(45) Date of Patent: Nov. 20, 2018

(54) PULLEY DEVICE FOR TENSIONER ROLLER OR WINDING ROLLER

(71) Applicants: Mickael Chollet, Joué-lès-Tours (FR); Alain Gezault, Vineuil (FR); Torbjorn Hedman, Saint Cyr sur Loire (FR); Romuald Lescorail, Saint Cyr sur Loire (FR); Frederic Liege, Monts (FR); Flavien Tesniere, Saint-Cyr-sur-Loire (FR); Nicolas Tronquoy, Fondettes (FR)

(72) Inventors: Mickael Chollet, Joué-lès-Tours (FR); Alain Gezault, Vineuil (FR); Torbjorn Hedman, Saint Cyr sur Loire (FR); Romuald Lescorail, Saint Cyr sur Loire (FR); Frederic Liege, Monts (FR); Flavien Tesniere, Saint-Cyr-sur-Loire (FR); Nicolas Tronquoy, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 239 days.

(21) Appl. No.: 15/170,112

(22) Filed: Jun. 1, 2016

(65) Prior Publication Data
US 2016/0356375 A1 Dec. 8, 2016

(30) Foreign Application Priority Data
Jun. 2, 2015 (FR) ...................... 15 54988

(51) Int. Cl.
*F16H 55/36* (2006.01)
*F16C 35/073* (2006.01)
(Continued)

(52) U.S. Cl.
CPC .......... *F16H 55/36* (2013.01); *F16C 13/006* (2013.01); *F16C 35/073* (2013.01); *F16H 7/20* (2013.01);
(Continued)

(58) Field of Classification Search
CPC .... F16H 55/36; F16H 7/20; F16H 2007/0865; F16H 2007/0878; F16C 123/006; F16C 35/073; F16C 41/04; F16C 2361/63
See application file for complete search history.

(56) References Cited

U.S. PATENT DOCUMENTS

2004/0097313 A1* 5/2004 Singer ................... F16C 13/006
474/199
2007/0025655 A1* 2/2007 Barraud .................. F16C 35/04
384/546
(Continued)

FOREIGN PATENT DOCUMENTS

EP     2339211 A1   6/2011
FR     2954437 A1   6/2011
WO  2010/006857 A1  1/2010

*Primary Examiner* — Michael R Mansen
*Assistant Examiner* — Robert T Reese
(74) *Attorney, Agent, or Firm* — Bryan Peckjian; SKF USA Inc. Patent Dept.

(57) ABSTRACT

A pulley device for a tensioner roller provides a pulley, a bearing, a spacer supporting the bearing. The spacer is provided with a through bore, and a securing bolt extending to the inside of the bore in the spacer. The device includes at least one means for the temporary locking of the securing bolt in relation to the spacer, the temporary locking means being separable and inserted between the bolt and the spacer. A pulley device for a winding roller is also provided.

14 Claims, 5 Drawing Sheets

(51) Int. Cl.
*F16H 7/20* (2006.01)
*F16C 13/00* (2006.01)
*F16H 7/08* (2006.01)
*F16C 41/04* (2006.01)

(52) U.S. Cl.
CPC .......... *F16C 41/04* (2013.01); *F16C 2361/63* (2013.01); *F16H 2007/0865* (2013.01); *F16H 2007/0878* (2013.01)

(56) References Cited

U.S. PATENT DOCUMENTS

| | | | |
|---|---|---|---|
| 2011/0111900 A1* | 5/2011 | Wilson | F16C 13/006 474/166 |
| 2011/0152025 A1* | 6/2011 | Wilson | F16C 13/006 474/166 |
| 2014/0004985 A1* | 1/2014 | Lescorail | F16H 7/12 474/166 |
| 2015/0267791 A1* | 9/2015 | Hedman | F16H 7/20 474/199 |
| 2016/0327146 A1* | 11/2016 | Lescorail | F16C 35/073 |
| 2017/0037953 A1* | 2/2017 | Liege | F16H 7/20 |

* cited by examiner

PULLEY DEVICE FOR TENSIONER ROLLER OR WINDING ROLLER

CROSS-REFERENCE

This application claims priority to French patent application no. 1554988 filed on Jun. 2, 2015, the contents of which are fully incorporated herein by reference.

FIELD OF THE INVENTION

The present invention relates to the field of pulley devices for tensioner rollers or winding rollers arranged to engage with a drive chain or drive belt such as an automotive vehicle internal combustion engine timing belt.

BACKGROUND OF THE INVENTION

Such rollers are used in general to maintain a constant tension on the belt or chain within a determined range or to modify locally the routing of the belt or chain. The terms tensioner roller and winding rollers, respectively, are used. In winding rollers, the pulley is mounted rotationally on a bolt or axle through the intermediary of a bearing, the roller then being attached directly or indirectly to the engine block or to a component of a tensioner roller device, for example an articulated or eccentric member. The bearing is any mechanical device enabling the operation of a pivot connection between the pulley and the bolt or axle, and to this end may be a rolling bearing or the like.

In general, a spacer is used in conjunction with the bolt or axle to attach the roller to its support. During installation, it is desirable for the axle or bolt to be axially attached to the other components comprising the roller and containing the pulley. This provides an assembly which cannot be dismantled, is easy to handle and transport and which may be installed easily.

To this end, a pulley device for a tensioner roller comprising a pulley, a bearing, a spacer supporting the bearing and a securing bolt that is axially immobilised in relation to the spacer is known from document FR 2 954 437. The relative axial engagement of the securing bolt and the spacer is achieved by means of a retaining ring arranged to engage with a groove cut into the securing bolt.

One disadvantage of this solution, inter alia, is that it requires a specific design for the securing bolt. Furthermore, a relatively large area must be left free on the frontal surface of the spacer to allow the installation of the retaining ring. The requirement reduces the contact surface between the spacer and its support considerably.

The aim of the present invention is to eliminate the disadvantages.

SUMMARY OF THE INVENTION

Moreover, the aim of the present invention is to provide a pulley device that is simple to manufacture, assemble and which is economical.

To this end, a pulley device is proposed for a belt or chain tensioner roller or winding roller comprising a pulley, a bearing, a spacer supporting the bearing and provided with a through bore, and a securing bolt extending to the inside of the bore in the spacer. The device provides in addition at least one means for the temporary locking of the securing bolt in relation to the spacer, the temporary locking means being separable and inserted between the bolt and the spacer.

The term "separable" is understood to mean a means of locking which may be sheared by a mechanical action of the user, when installing the device, for example. For example, the mechanical action may be manual, such as applying a tightening torque manually to the securing bolt. Such a pulley device makes it possible to lock the securing bolt temporarily in relation to the spacer, for example during transportation, until the final installation of the device on an exterior support. Furthermore, it is possible to use standard design securing bolts not equipped with a groove.

In a preferred embodiment, the locking means is inserted radially between the bolt and the bore in the spacer.

In one embodiment, the temporary locking means locally covers both the securing bolt and the spacer.

In one embodiment, the temporary locking means is installed entirely inside a recess extending from the through bore in the spacer.

Advantageously, the recess opens out onto a radial surface at an axial end of the spacer opposite a bolt head.

In one embodiment, the recess is annular.

In another embodiment, the recess is discrete, i.e. it extends to within a given angular sector, for example between 20° and 60° and preferably between 35° and 45°. Advantageously, the through bore of the spacer provides a plurality of such recesses.

The securing bolt may provide a head and a shank. Advantageously, the securing bolt shank provides at least one threaded section, the temporary locking means being arranged axially on the side opposite the bolt head in relation to the spacer.

In one embodiment, the temporary locking means is arranged radially between the bore in the spacer and the threaded section of the bolt.

Advantageously, the locking means provides an attachment point made from synthetic material.

In one embodiment, a plurality of temporary locking means, for example, three, spaced apart from each other in the circumferential direction may be provided.

Preferably, the pulley provides an external axial section and an internal axial section, attached to an exterior ring of the bearing.

According to another aspect, an assembly procedure for a pulley device for a belt or chain tensioner roller or winding roller is proposed, in which a sub-assembly comprising a pulley, a bearing, a spacer supporting the bearing and provided with a through bore is mounted, a securing bolt is inserted inside of the bore in the spacer and the position of the securing bolt is maintained in relation to the spacer through the removal of at least one separable means between the bolt and the spacer.

BRIEF DESCRIPTION OF THE DRAWINGS

Other aims, features and advantages of the invention will become apparent from reading the following description, provided solely as a non-exhaustive example, with reference to the appended drawings in which.

DETAILED DESCRIPTION OF THE INVENTION

Figure 1:
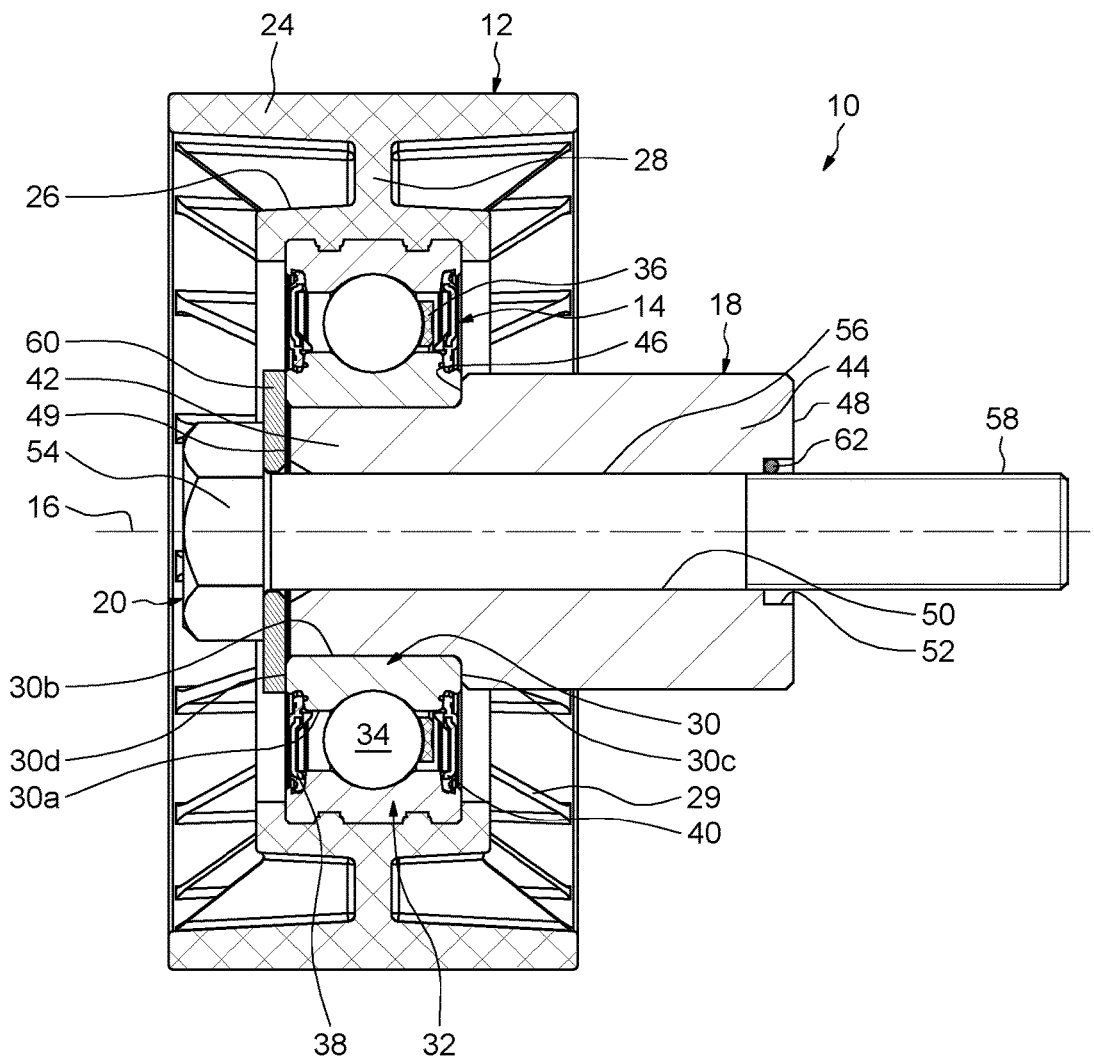
FIG. 1 is an axial cut-away view of a pulley device according to a first exemplary embodiment of the invention.
Figure 3:
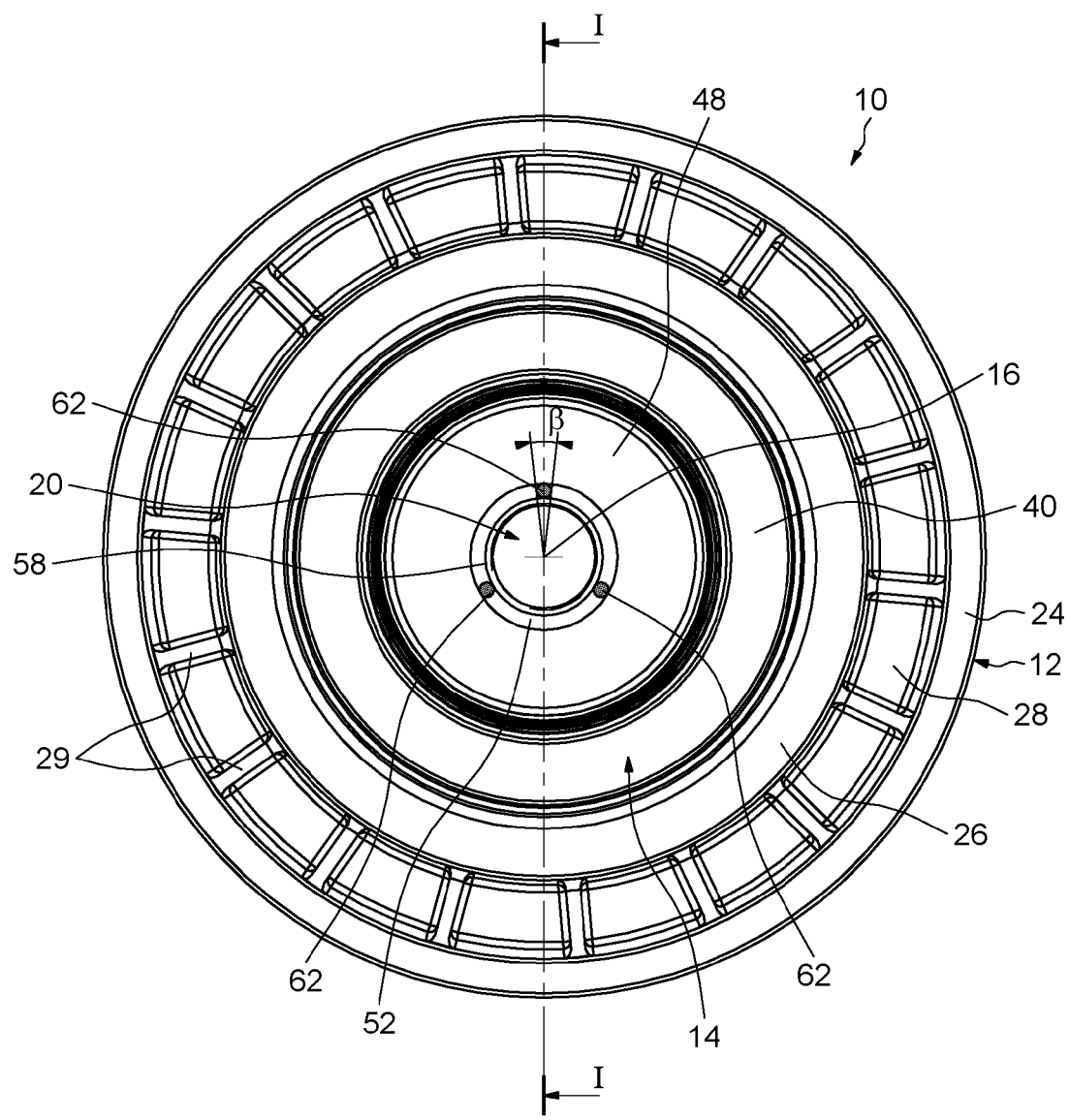
FIG. 3 is a side view of the pulley device of FIG. 1.

As can be seen in FIGS. 1 and 3, the pulley device for a belt or chain tensioner roller or winding roller, with reference 10 in its entirety, provides a pulley 12, a rolling bearing 14, of geometric axis 16, a spacer 18 with an overall cylindrical shape and a securing bolt 20 coaxial with axis 16. As will be described in greater detail below, device 10 provides means provided for securing or temporarily locking securing bolt 20 in relation to spacer 18.

Pulley 12 provides an exterior axial section 24 providing an exterior surface intended for engagement with a belt or chain (not shown), an interior axial section 26 and an intermediate annular radial section 28 connecting the sections. Exterior section 24 and interior section 26 are arranged coaxially to axis 16. Stiffening splines 29 are also provided between the interior axial section 26 and exterior axial section 24 and are connected to the intermediate section 28.

Rolling bearing 14 provides an interior ring 30, an exterior ring 32, a line of rolling elements 34, embodied here in the form of ball bearings, arranged between the raceways of the rings, and a cage 36 maintaining the circumferential spacing of the rolling elements 34. Rolling bearing 14 also provides on each side an annular seal 38, 40 attached to the exterior ring 30 to close off the radial space between the rings, and inside of the radial space are housed the rolling elements 34 and the cage 36.

In the exemplary embodiment shown in the drawing, interior ring 30 and exterior ring 32 are solid. The term "solid ring" is understood to mean a ring whose shape is obtained by means of machining with the removal of filings (turning, grinding) from pipes, bars, forged and/or rolled blanks. The interior ring 30 provides a rotationally symmetrical axial exterior surface 30a on which is arranged the toroidal raceway for the rolling elements 34. Interior ring 30 also provides a bore 30b engaged on spacer 18 and two radial frontal surfaces 30c, 30d axially delimiting the bore and the exterior surface. Exterior ring 32 has a similar design.

In the exemplary embodiment depicted, pulley 12 is obtained by over-moulding over exterior ring 32 with a plastic material such as a polyamide. Excellent cohesion between the parts results from this. Alternatively, the pulley may be made from sheet metal and engaged onto exterior ring 32. In another variant, the pulley 12 and the exterior ring 32 may be made from a single piece.

Spacer 18 of axis 16 provides an axial cylindrical section 42 onto which the interior ring 30 of rolling bearing 14 is fitted and which is extended, at an axial end, by an axial cylindrical section 44 of larger diameter. A radial annular shoulder 46 is arranged between the axial sections 42, 44 and forms an abutment surface against which the radial surface 30c of interior ring 30 bears axially. Axially on the side opposite radial shoulder 46, the axial section 44 is delimited by a radial frontal surface 48 suitable for bearing against a support (not shown) external to the device to enable the device to be mounted and secured on the support. The support may, for example, be the engine block, an articulated or eccentric member of the associated automatic tensioner roller. Axial section 44 protrudes axially in relation to the pulley 12. Axially on the side opposite the radial frontal surface 48, the axial section 42 is delimited by a radial frontal surface 49. Spacer 18 is delimited axially by the radial frontal surfaces 48 and 49.

In this embodiment, the axial dimension of the axial section 42 is very slightly less than that of the interior ring 30. Therefore, radial surface 49 is slightly offset axially in relation to the radial surface 30d of the interior ring 30. Spacer 18 therefore leaves the radial surface 30d completely free such that it may be used as a reference surface and bear against any other surface.

Figure 2:
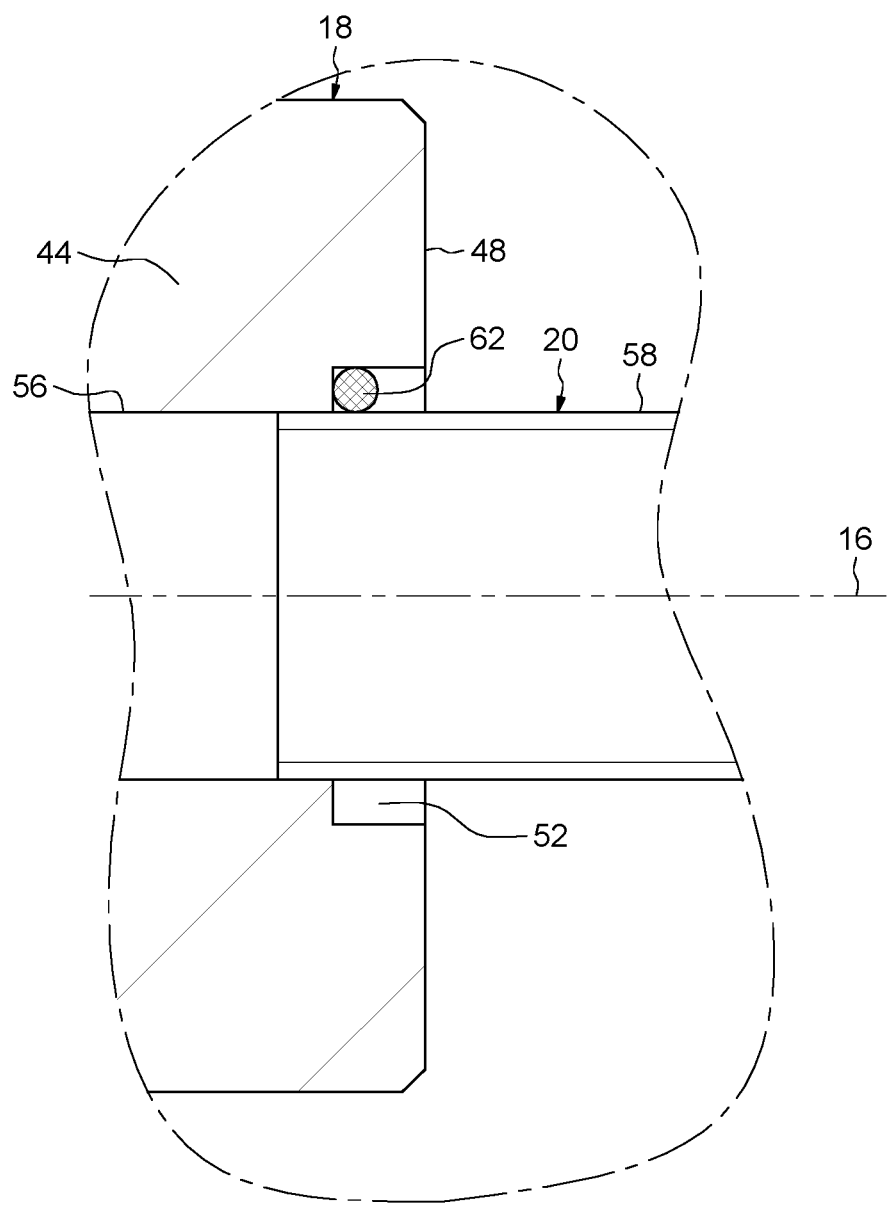
FIG. 2 is a detail view of FIG. 1.

Spacer 42 provides a cylindrical bore 50, of axis 16, into which extends securing bolt 20. Securing bolt 20 may be fitted with a greater or lesser radial clearance inside bore 50. Bore 50 is a through bore. Bore 50 extends axially from the radial surface 49 to radial surface 48. As shown more clearly in FIG. 2, a recess 52 is cut into bore 50 of spacer 18, opening onto the radial surface 48. The recess 52 extends from the bore 50. The recess 52 here extends radially outwards from the bore. The recess 52 in this exemplary embodiment is a counterbore, i.e. a cylindrical bore with flat bottom, located in the radial plane in relation to axis 16. As shown in FIG. 2, the axial section of the recess 52 is rectangular. Alternatively, the recess 52 may present an axial section of a different shape, square-section for example.

With reference once more to FIG. 1, securing bolt 20 provides a tightening head 54 and a shaft equipped with a smooth section 56 extending axially from the head and being centred inside the bore 50, and a threaded section 58 opposite the head. The threaded section 58 of the bolt protrudes axially in relation to radial surface 48 of the spacer 18. It can be inserted into a threaded hole provided in the support external to the device. Device 10 also provides a washer 60 arranged about the smooth section 56, in contact with the head 54. Head 54 bears axially against the washer 60, the latter bearing axially against the radial frontal surface 30d of the interior ring 30 freed by spacer 18.

As shown above, the device 10 provides means for locking the securing bolt 20 temporarily. In the exemplary embodiment shown, these means are embodied as attachment points 62 inserted radially between the bolt 20 and the bore 50 of the spacer. The attachment points 62 are mounted inside the recess 52 of the spacer. As is shown in FIG. 3, three attachment points 62 are provided here. The three attachment points 62 are spaced substantially 120° from each other in the circumferential direction. The attachment points are made from synthetic material, polyamide material for example, deposited by over-moulding for example. Alternatively, the synthetic material may be adhesive or silicone. Each attachment point 62 is arranged to cover both the recess 52 and the threaded section 58 of the bolt. The attachment points 62 in the exemplary embodiment shown are bearing on the bottom of the recess 52. Alternatively, it is possible to provide another arrangement of attachment points inside the recess 52. In FIGS. 1 to 3, the attachment points are shown schematically in the form of a sphere. Attachment points 62 retain securing bolt 20 axially and circumferentially in relation to the spacer 18.

By adjusting the quantity of synthetic material removed, it is possible to define a shearing threshold for the temporary locking of bolt 20 in relation to the spacer 18. In other terms, in this embodiment the number of attachment points 62 and the quantity of synthetic material removed per attachment point 62 may advantageously be calculated such that the action of tightening bolt 20 manually by the user results in the shearing of the locking of bolt 20 in relation to spacer 18.

As a result, the locking is temporary and is only effective during storage and transportation of the pulley device 10.

As shown in FIG. 3, each attachment point 62 extends along the length of the recess 52, within an angular sector 13 about axis 16. In this embodiment, the angle β is between 1° and 10°, preferably between 1° and 5°, and in particular substantially equal to 3°. This local application of the locking means reinforces the temporary character of the locking means. Alternatively, each temporary locking means may be embodied in the form of at least one continuous line of adhesive inside the recess 52, extending over a wider angular sector.

In this embodiment, the device provides three attachment points 62. However, it is not considered to be straying from the scope of the invention by applying a different number of attachment points 62, for example, 1, 2, 4 or more.

The following procedure is used to assemble the pulley device 10.

Firstly, a sub-assembly comprising the pulley 12, the rolling bearing 14 and the spacer 18 is assembled. To this end, the pulley 12 is assembled with the exterior ring 26 of the rolling bearing 14. Next, the spacer 18 is installed in bore 30b of the interior ring 30 of the rolling bearing 14 until shoulder 46 comes into abutment with the radial frontal surface 30c. Secondly, the securing bolt 20 is inserted into the washer 60 then into the spacer 18 of the sub-assembly.

Thirdly, the attachment points 62 are formed through the deposition of a material consisting of adhesive and silicone. The quantity of material deposited is sufficient for each attachment point 62 to come into contact with the annular recess 52 and the threaded section 58 of the securing bolt 20. Alternatively, attachment points 62 may be deposited through over-moulding of a polyamide material inside the recess 52.

Local means for the temporary locking of the securing bolt 20 in relation to the spacer 18 are obtained. The locking means fulfil a dual function of retaining the bolt 20 axially and circumferentially. These locking means are separable to permit the temporary locking of the bolt 20, for example, limited to storage and transportation of the pulley device 10.

By providing means for locking the securing bolt 20 temporarily in relation to the spacer 18, the securing bolt 20 can be tightened more securely in its support. Indeed, during the tightening of securing bolt 20, when the radial frontal surface 48 comes into abutment against the exterior support, the locking means cease to have effect. Because securing bolt 20 can pivot in relation to the spacer 18, the securing bolt may be tightened more securely.

Furthermore, in the exemplary embodiment shown, the locking means 62 are recessed from or fit flush with the surface 48 for mounting the spacer on its support. The absence of members protruding in relation to the surface 48, with the exception of the securing bolt 20, makes it possible to position the pulley device 10 easily against its support. However, in an embodiment variant, it could be possible to provide temporary locking means between the securing bolt 20 and the frontal surface 48 of the spacer. In this scenario, the locking means are sheared before the spacer 18 comes into contact with the associated support.

Furthermore, the pulley device 10 offers the advantage of not requiring a specific design of the securing bolt 20. The design of the locking means also allows the recess 52 to be of a small size, which minimises the loss of contact surface between the spacer 18 and the exterior support.

Figure 4:
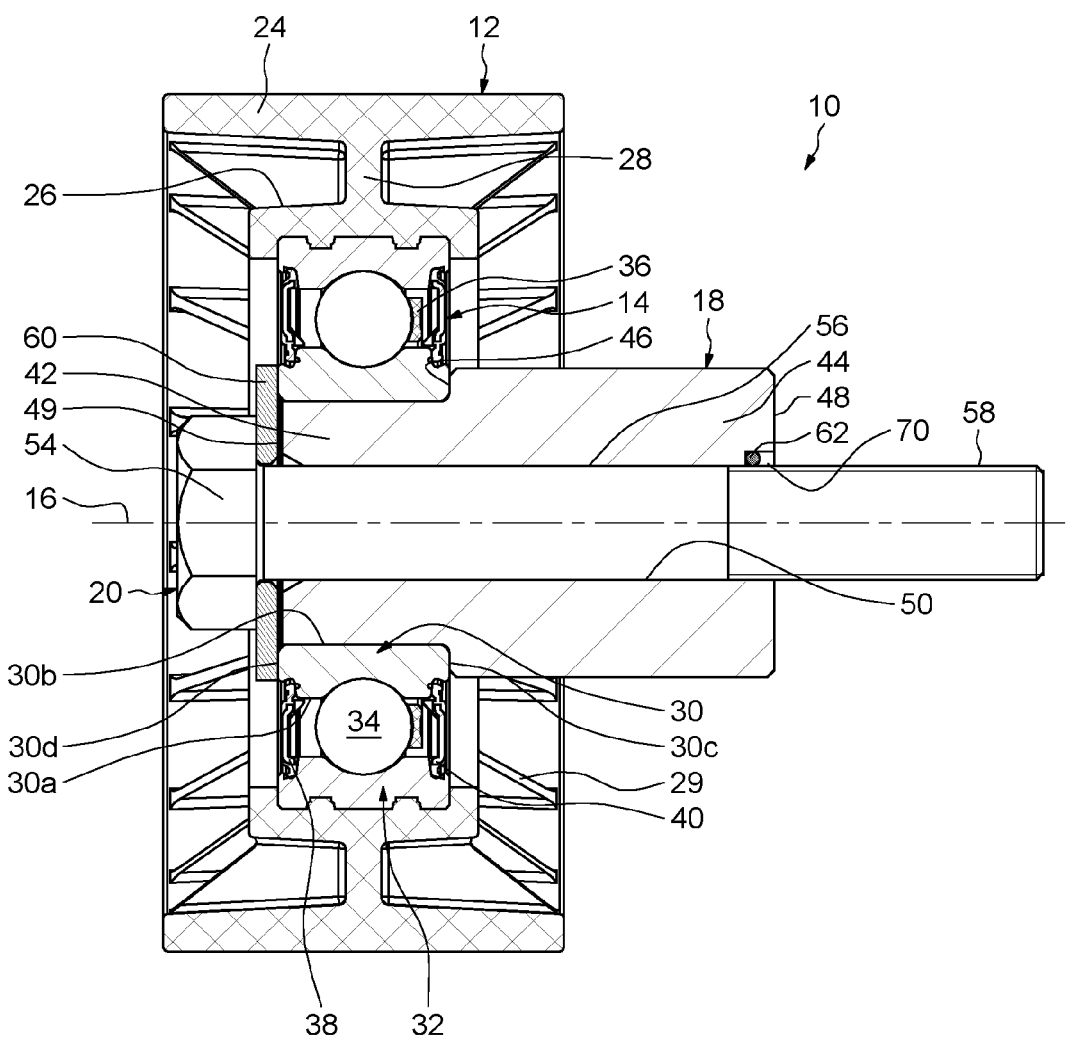
FIG. 4 is an axial cut-away view of a pulley device according to a second exemplary embodiment of the invention.
Figure 5:
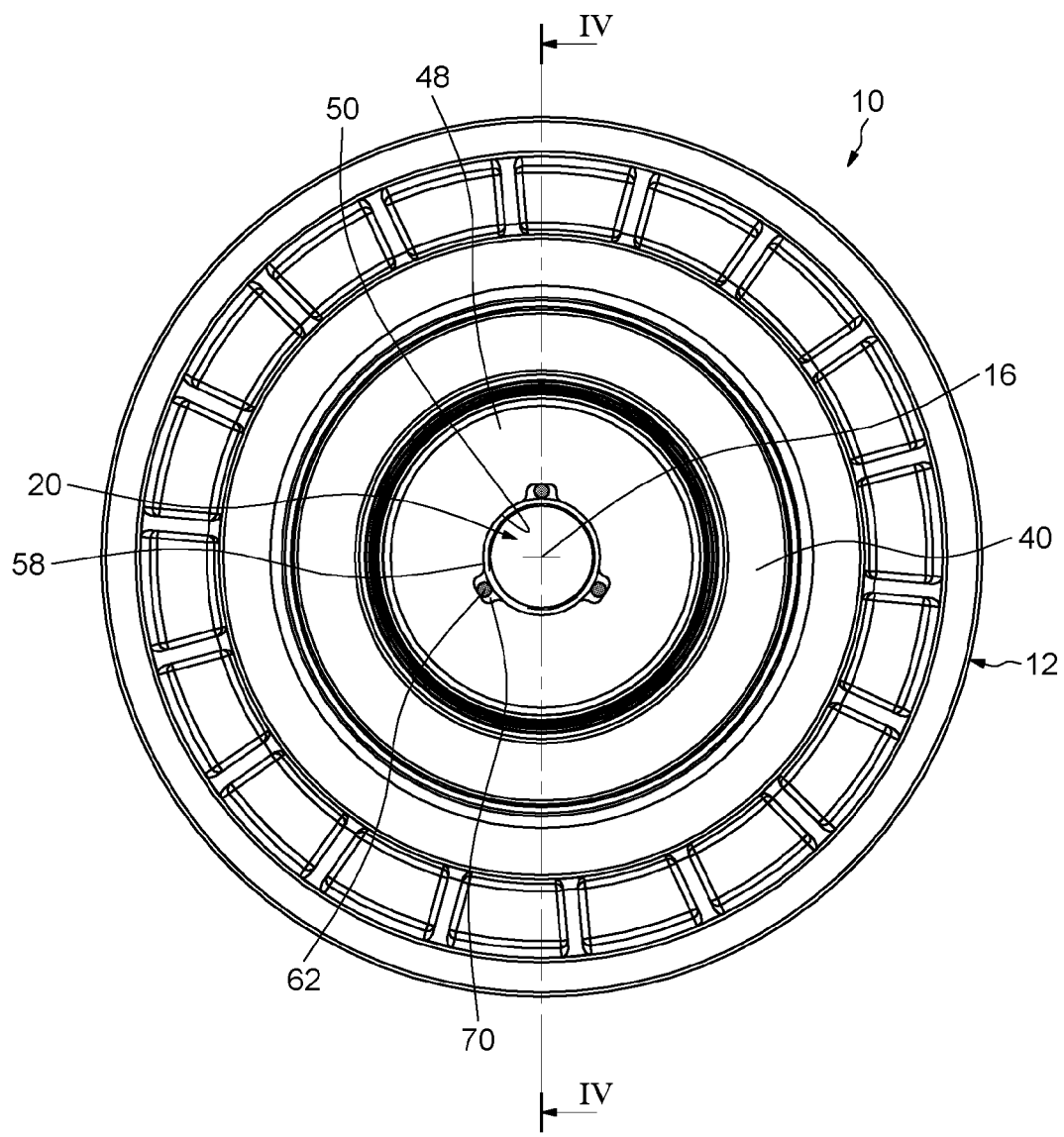
FIG. 5 is a side view of the pulley device of FIG. 4.

The second exemplary embodiment shown in FIGS. 4 and 5, in which the identical elements have the same references, differs from the first example described in that the annular recess of the spacer is replaced by at least one recess 70 extending to within an angular sector of strictly less than 360°, and in this particular example, of between 35° and 45°. Each recess 70 extends from the bore 50. Each recess 70 here extends radially outwards from the bore.

Advantageously, there are an identical number of recesses 70 and attachment points 62. Each attachment point 62 is arranged inside its own recess 70. In this exemplary embodiment, three identical recesses 70 are arranged on the spacer 18 and are spaced apart from each other in the circumferential direction, here, in a regular manner. Such an exemplary embodiment is particularly advantageous in that the contact surface between the spacer and its support is greater.

The invention has been illustrated on the basis of a pulley device comprising a rolling bearing provided with an interior ring, an exterior ring and at least one row of rolling elements arranged between the rings. Alternatively, the bearing may be of the slide bearing type and provide an annular body, formed from thermoplastic material for example, and may provide radial grooves able to be full of lubricant. In another variant, the slide bearing may provide two tracks or rings sliding directly against each other.

Finally, this solution provides a more economical and easy to implement means that provides, in addition, improved mounting of the pulley device on its exterior support.

The invention claimed is:

1. A pulley device for a tensioner roller comprising:
   a pulley;
   a bearing;
   a spacer supporting the bearing and provided with a through bore, and
   a securing bolt extending to the inside of the bore in the spacer, the securing bolt having a tightening head and a shaft equipped with a smooth section extending axially from the tightening head and a threaded section extending axially from the smooth section, opposite the tightening head, the smooth section having a diameter that is greater than a minor diameter of the threaded section;
   wherein the device further comprises at least one means for the temporary locking of the securing bolt in relation to the spacer, the temporary locking means being separable and inserted between the bolt and the spacer, the at least one means for temporary locking of the securing bolt engaging with the threaded section of the securing bolt at a location proximate a transition between the smooth section and the threaded section, the pulley device being designed for a tensioner roller.

2. The pulley device according to claim 1, wherein the locking means is inserted radially between the bolt and the bore in the spacer.

3. The pulley device according to claim 1, wherein the temporary locking means locally covers both the securing bolt and the spacer.

4. The pulley device according to claim 1, wherein the temporary locking means is installed entirely inside a recess extending from the bore in the spacer.

5. The pulley device according to claim 4, wherein the recess opens onto a radial surface at an axial end of the spacer opposite a head of the securing bolt.

6. The pulley device according to claim 4, wherein the recess is annular.

7. The pulley device according to claim 4, wherein the recess extends to within a given angular sector is between 20° and 60°.

8. The pulley device according to claim 4, wherein the recess extends to within a given angular sector is between 35° and 45°.

9. The device according to claim 1, wherein the temporary locking means is arranged axially on the side opposite the bolt head in relation to the spacer.

10. The device according to claim 9, in which the temporary locking means is arranged radially between the bore in the spacer and the threaded section of securing bolt.

11. The device according to claim 1, wherein the locking means comprises an attachment point made from synthetic material.

12. The device according to claim 1, comprising a plurality of temporary locking means spaced apart from each other in the circumferential direction.

13. A method of assembling a pulley device for a belt or chain tensioner roller or winding roller, the method comprising:
    assembling a sub-assembly including a pulley, a bearing, a spacer supporting the bearing and provided with a through bore;
    obtaining a securing bolt, the securing bolt having a tightening head and a shaft equipped with a smooth section extending axially from the tightening head and a threaded section extending axially from the smooth section, opposite the tightening head, the smooth section having a diameter that is greater than a minor diameter of the threaded section;
    inserting the securing bolt inside of the through bore in the spacer; and
    maintain the position of the securing bolt in relation to the spacer through the removal of at least one separable means between the bolt and the spacer, the at least one separable means engaging with the threaded section of the securing bolt at a location proximate a transition between the smooth section and the threaded section.

14. A pulley device for a winding roller comprising:
    a pulley;
    a bearing;
    a spacer supporting the bearing and provided with a through bore, and
    a securing bolt extending to the inside of the bore in the spacer, the securing bolt having a tightening head and a shaft equipped with a smooth section extending axially from the tightening head and a threaded section extending axially from the smooth section, opposite the tightening head, the smooth section having a diameter that is greater than a minor diameter of the threaded section;
    wherein the device further comprises at least one means for the temporary locking of the securing bolt in relation to the spacer, the temporary locking means being separable and inserted between the bolt and the spacer, the at least one means for temporary locking of the securing bolt engaging with the threaded section of the securing bolt at a location proximate a transition between the smooth section and the threaded section,
    the pulley being designed for a winding roller.

* * * * *